(12) United States Patent
Zhang et al.

(10) Patent No.: US 11,698,974 B1
(45) Date of Patent: Jul. 11, 2023

(54) METHOD AND APPARATUS FOR AUTHORIZING UNLOCKING OF A DEVICE

(71) Applicant: Marvell Asia Pte, Ltd., Singapore (SG)

(72) Inventors: Minda Zhang, Westford, MA (US); Tolga Nihat Aytek, Framingham, MA (US); Thomas Kniplitsch, Inshe'm (DE); Axel Dielmann, Leonberg (DE)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/647,744

(22) Filed: Jan. 12, 2022

Related U.S. Application Data (62) Division of application No. 16/527,302, filed on Jul. 31, 2019, now Pat. No. 11,250,135.

(60) Provisional application No. 62/712,819, filed on Jul. 31, 2018.

(51) Int. Cl.
*H04L 29/06* (2006.01)
*G06F 21/57* (2013.01)
*G06F 21/44* (2013.01)

(52) U.S. Cl.
CPC .......... *G06F 21/575* (2013.01); *G06F 21/44* (2013.01)

(58) Field of Classification Search
CPC .............................. G06F 21/575; G06F 21/44
See application file for complete search history.

(56) References Cited

U.S. PATENT DOCUMENTS

| | | | |
|---|---|---|---|
| 10,185,509 B1* | 1/2019 | Farhan | G06F 3/0674 |
| 2006/0129848 A1* | 6/2006 | Paksoy | G06F 21/35 713/193 |
| 2007/0192610 A1* | 8/2007 | Chun | G06F 21/575 713/176 |
| 2009/0113558 A1 | 4/2009 | Prabhakaran et al. | |
| 2009/0172383 A1 | 7/2009 | Cumming et al. | |

* cited by examiner

*Primary Examiner* — Jason K Gee (57) ABSTRACT

A programmable integrated circuit device includes a programmable core, a boot device configured to boot up the programmable core, and a one-time programmable memory module controlling life cycle states of the programmable integrated circuit device, including (i) an operational state during which programming resources of the programmable device are locked, and (ii) an inspection state in which the programming resources of the programmable device are accessible. The one-time programmable memory module is configured to allow unidirectional advance from the operational state to the inspection state, when authorized by a lock control circuit responsive to control signals from the boot device to authorize the unidirectional advance from the operational state to the inspection state. Authorization of the unidirectional advance may be limited to a time interval during a boot cycle of the programmable device. The unidirectional advance may be based on receipt of an authenticated request from a requester.

9 Claims, 5 Drawing Sheets

| JTAGControl | |
|---|---|
| Signature="JTAG", Opcode=0x0013, Structure Size=20 | |
| Text | Binary |
| JTAGControl:<br>{<br>   UUID: //value<br>   AdvanceLifeCycle: //Numeric<br>Value to be interpreted by SOC<br><br><br>} | Struct jtagcontrol..s<br>{<br>   BLOCKHDR_T   hdr;<br>   uint64_t   UUID;<br>   uint32_t   LCS;<br><br><br>} |

401 { JTAGControl
402 { Signature row
403 { Text/Binary content

METHOD AND APPARATUS FOR AUTHORIZING UNLOCKING OF A DEVICE

CROSS REFERENCE TO RELATED APPLICATION

This is a division of copending, commonly-assigned U.S. patent application Ser. No. 16/527,302, filed Jul. 31, 2019 (now U.S. Pat. No. 11,250,135), which claims the benefit of, and was copending with, commonly-assigned U.S. Provisional Patent Application No. 62/712,819, filed Jul. 31, 2018, each of which is hereby incorporated by reference herein in its respective entirety.

FIELD OF USE

This disclosure relates to diagnostic operations for integrated circuit devices. More particularly, this disclosure relates to authorizing the unlocking of a device that has previously been deployed, without revealing operational programming.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Various types of integrated circuit devices accept some form of programming when deployed by a user after initial delivery by manufacturer. For example, field-programmable gate arrays, as well as processor-based systems-on-chip (SoCs) may be programmed by a user with proprietary or confidential software, keys and/or data. In some cases, such devices may be returned from the field and require diagnosis by a party who should not have access to the proprietary or confidential programming.

SUMMARY

A programmable integrated circuit device in accordance with implementations of the subject matter of this disclosure includes a programmable core, a boot device configured to boot up the programmable core, and a one-time programmable memory module comprising a lock control circuit, the one-time programmable memory module controlling life cycle states of the programmable integrated circuit device, the life cycle states of the one-time programmable integrated circuit device including (i) an operational state during which programming resources of the programmable integrated circuit device are locked, and (ii) an inspection state in which the programming resources of the programmable integrated device are accessible. The one-time programmable memory module is configured to allow unidirectional advance, when authorized, from the operational state to the inspection state. and the lock control circuit of the one-time programmable memory module is responsive to control signals from the boot device to authorize the unidirectional advance from the operational state to the inspection state.

In a first implementation of such a programmable integrated circuit device, the boot device may output a first one of the control signals that limits authorization of the unidirectional advance to a time interval during a boot cycle of the programmable integrated circuit device. In that implementation, the time interval may be coterminous with the boot cycle, or the time interval may begin at a predetermined time after the boot cycle begins, or time interval may end at a predetermined time before the boot cycle ends.

In a variant of that first implementation, the boot device may be configured to output a second one of the control signals, during the time interval, to authorize the unidirectional advance from the operational state to the inspection state, based on receipt of a request from a requester.

According to that variant of the first implementation, the boot device may be configured to output the second one of the control signals only when the request includes authenticated credentials.

The boot device may be configured to output the second one of the control signals only when the request is verified to be targeted at the programmable integrated circuit device. In such a case, the programmable integrated circuit device may further include an unalterable memory having a unique identifier stored therein, and the boot device may be configured to verify that the request is targeted at the programmable integrated circuit device by comparing an identifier in the request to the unique identifier stored in the unalterable memory. Also in such a case, the boot device may be configured to verify that the request is targeted at the programmable integrated circuit device by generating a random number, sending the generated random number to the requester, receiving a digitally signed random number from the requester, and comparing the digitally signed random number to the generated random number.

In a second implementation of such a programmable integrated circuit device, the boot device may be further configured to, after authorizing the unidirectional advance, signal the one-time programmable memory to initiate the unidirectional advance.

In a second implementation of such a programmable integrated circuit device, the one-time programmable memory may be fuse-based.

According to implementations of the subject matter of this disclosure, a method of diagnosing a programmable integrated circuit device having (i) an operational state during which programming resources of the programmable integrated circuit device are locked, and (ii) an inspection state in which the programming resources of the programmable integrated device are accessible, includes rebooting the programmable integrated circuit device, receiving, during the rebooting, a request from a requester to the programmable integrated circuit device to authorize an advance from the operational state to the inspection state, and verifying the request and authorizing the advance from the operational state to the inspection state when the request is verified.

In a first implementation of such a method, the verifying may include authenticating credentials included in the request.

In a first variant of that first implementation, the verifying may include determining that the request is received during a predetermined time interval during a boot cycle of the programmable integrated circuit device. In that first variant, the time interval may be coterminous with the boot cycle, or the time interval may begin at a predetermined time after the boot cycle begins, or the time interval may end at a predetermined time before the boot cycle ends.

In a second variant of that first implementation, the verifying may include verifying that the request is targeted at the programmable integrated circuit device. Such verifying may include comparing an identifier in the request to a unique identifier stored in an unalterable memory of the programmable integrated circuit device. Such verifying also may include generating a random number, sending the generated random number to the requester, receiving a digitally signed random number from the requester, and comparing the digitally signed random number to the generated random number.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

If a programmable integrated circuit device that has been deployed with proprietary or confidential software, keys and/or data is returned from the field for diagnosis and/or repair by a party other than the user who initially programmed the device, that party should not have access to the proprietary or confidential software, keys and/or data. The programming circuitry normally is disabled upon deployment, to prevent unauthorized or accidental changes in the field, as well as for security purposes.

However, leaving access to the programming circuitry disabled upon a return from the field could prevent effective—or any—diagnosis of the condition that caused the return from the field, which would frustrate correction of any systemic fault that could prevent recurrence of that condition. On the other hand, re-enabling access to the programming mechanism upon a return from the field not only could give unauthorized access to proprietary or confidential software, keys and/or data, but also could unwittingly provide a route of attack on other deployed devices of the same type by an attacker who records the signals used to re-enable access. In addition, a system that supports re-enablement of the programming circuitry could be vulnerable to such an attack by an attacker who determines those signals independently (sometimes referred to as a "break once, read everywhere," or "BORE" attack).

Implementations of the subject matter of this disclosure allow an integrated circuit device to enter a "failure analysis" mode in which access to programming circuitry and scan chains is available, but proprietary or confidential software, keys and/or data have been deleted, or is otherwise inaccessible. In some implementations, once the failure analysis mode has been entered, the device cannot be returned to an operational state.

In accordance with such implementations, a boot mechanism of the integrated circuit device will set a first bit that either locks or unlocks the ability to authorize access to the programming circuitry and scan chains. On receipt of an authenticated request to authorize access during a time that the first bit is set to its unlock state, access will be authorized by setting a second bit. Normally, the first bit will be set to its unlock state at or near the beginning of the boot process. At or near the end of the boot process, the first bit will be set to its lock state until the next boot cycle. Therefore, attempts to change the second bit during run time (to gain unauthorized access) will not be possible.

In some implementations, the boot process requires an authorized digital signature. For example, an authorized PKI-based key may be used. In addition, to prevent a BORE attack, each device may have a unique unalterable identifier (UUID), which the boot mechanism would expect to find in a legitimate request to enter failure analysis mode. The request would be rejected if that identifier were missing or incorrect, which might signify a BORE attack in which a legitimate request addressed to another device had been recorded and is being replayed toward a different device.

Alternatively, the boot process may, upon receipt of a request to enter the failure analysis mode, respond with a random number, which the boot process would then expect back, signed by the host that issued the request. Again, if signals were recorded from a request to a different device, the signed random number would be wrong. And a "false host" would be unable to access the secure signing key, and so could not perform the signing operation on an intercepted random number. Other alternative methods to authenticate the request to prevent BORE attacks may be used.

As noted above, techniques according to implementations of the subject matter of this disclosure may be used to secure any type of programmable integrated circuit device having a failure analysis mode that might give access to proprietary or confidential software, keys and/or data. The remainder of this disclosure will be set forth in the context of a secure SoC as an example. However, the subject matter of this disclosure should not be considered to be limited to an SoC.

In accordance with the subject matter of this disclosure, access may be granted to device resources of an SoC when the device, for example, is returned to the manufacturer after a failure in the field. In an earlier stage, the device will have been programmed by the user with proprietary or confidential software, keys and/or data via a programming interface, such as a JTAG interface, or any serial port interface, for use in the field for a function required by the user. Normally, when a device has been returned for failure analysis, the user will have erased all proprietary or confidential programming, if possible. Entry into failure analysis mode should erase such programming in any event. However, if an attacker were to gain access without authorization, the attacker might be able to obtain access to the programming scan chains.

In implementations of the subject matter of this disclosure, access to the failure analysis mode is controlled through the root-of-trust boot mechanism of the integrated circuit device. For example, the device may include a secure, non-tamperable boot ROM that can process a binary header or message protected by a public-key-infrastructure-based (PKI-based) key. In such implementations, the key-hash of the public key is securely stored in One Time Programmable (OTP) memory.

In addition, a device implementing the subject matter of this disclosure has a progression of life-cycle states which advance unalterably in only one direction in one order. For example, the states of the device may include a chip manufacturing (CM) state in which all programming access is open and no hard keys have been set. Next, in a device manufacturer (DM) state, hard keys have been programmed and locked, but programming access (e.g., via JTAG) remains open. Then, in a device deployment (DD) state, the programming access also has been locked, so that there is no access to write to or, more importantly, to read from, the programming scan chains.

Finally, in a failure analysis (FA) state, intended for use for debugging or inspection after the device has been returned from deployment because of a failure or malfunction, all hard keys have been cleared and the scan chains and the debug access point (DAP) port are unlocked, and internal resources are available for inspection.

As noted above, states advance unidirectionally. For example, a fuse may be blown to move from one state to the next, meaning that device can never return to a previous state. Therefore, in such an implementation, the device cannot be returned to the deployed state after entering the FA state.

As another component of security in implementations of the subject matter of this disclosure, a mechanism is provided to uniquely identify each integrated circuit device. Otherwise, in a so-called "man-in-the-middle," or "break once, read everywhere (BORE)," attack, a malicious actor could intercept and record the signals that authorize one particular integrated circuit device to enter the FA state, and play those signals back to authorize other integrated devices of the same model into the FA state to gain access to the scan chains or other resources of those other devices.

In one such implementation, each individual integrated circuit device is assigned a unique identifier. That unique identifier, different from the identifier of any other integrated circuit device, even of the same model, is stored in an unalterable way in the integrated circuit device. For example, the unique identifier could be stored in the one-time programmable memory of the integrated circuit device. An authorized user will know the unique identifier of the target integrated circuit device. When that user sends a message or signal to the target integrated circuit device to authorize entry into the FA state, that message includes the unique identifier. If the unique identifier in the message does not match the unique identifier stored in the device, even if the message is otherwise authenticated, the device will not be authorized to enter the FA mode in response to the message.

In another such implementation, when an integrated circuit device receives a message to authorize entry into the FA state, even if the message is otherwise authenticated, the integrated circuit device will send a random number back to the host device that issued the message. The host device will digitally sign the random number and send the signed random number back to the integrated circuit device. If the integrated circuit device does not receive back the same random number, properly signed by the host, the integrated circuit device will not authorize entry into the FA state.

Other types of unique identification may be devised.

Authorization of the transition to the FA state from the prior (e.g., DD) state is gated, in implementations of the subject matter of this disclosure, by two control bits. The first control bit is a time-based register lock bit that opens a window, or time interval, during which a message signaling that entry into the programming state should be authorized, to allow the life-cycle state to be advanced to the FA state, will even be processed. For example, the window may open (by changing the bit to a value—'0' or '1'—designating that the authorization state is unlocked and may be changed) when the boot sequence, or boot cycle, of the integrated circuit device begins (or at a defined interval thereafter), and may then close (by changing the bit to a value—'1' or '0'—designating that the authorization state is locked and cannot be changed) when the boot sequence ends, such that the window is coterminous with the boot sequence. Alternatively, the window could open at a defined interval after the boot sequence begins, and/or the window could close at a defined interval prior to the end of the boot sequence. Once set to the locking value, the time-based register lock bit is not set to the unlocking value until the next boot cycle. Therefore, if someone tries and fails to authorize entry into the programming state, and runs out of time, further attempts are not possible without rebooting.

Nor can the state be changed during run-time operation in the deployed state. If the time-based register lock bit is set to the locked value, then the integrated circuit device will not accept a request to authorize entry into the programming state. Therefore, if a malicious actor attempts to send a message including such a request during run time, the time-based register lock bit will be set to its locked value and the request will have no effect.

The second control bit is a programming bypass disable bit. Normally during run time, the programming bypass disable bit is set to a value signifying the bypass is in place (e.g., '1'='yes'), so that any attempt to access the programming of the integrated circuit device (e.g., via JTAG) is prevented. However, a proper message to authorize entry into the programming state, sent during the window defined by the time-based register lock, changes the value of the programming bypass disable bit to a value signifying the bypass is not in place (e.g., '0'='no').

The actual change from the DD run-time state to the FA failure analysis state—e.g., by burning a life-cycle fuse—may be accomplished after the bypass disable bit has been set by a command from the boot ROM itself, or by another source of authorized firmware or software.

Figure 1:
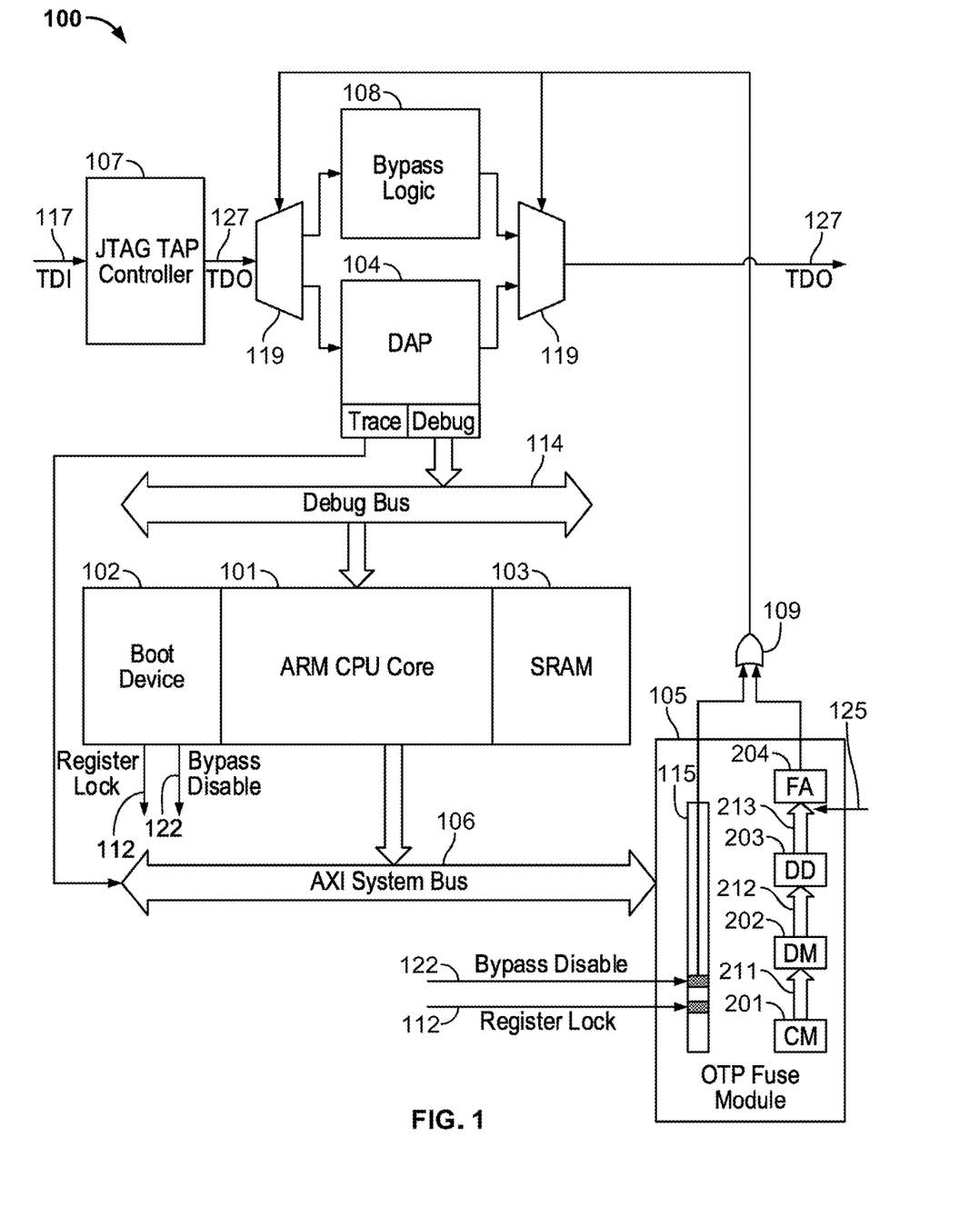
FIG. 1 is a schematic representation of a device incorporating the subject matter of this disclosure.

An example of an integrated circuit device 100 in which the subject matter of this disclosure may be implemented is shown in FIG. 1. A programmable CPU core 101 may be based on the ARM architecture licensed by ARM Holdings, although other CPU cores may be used. A boot device 102, such as a ROM, is used to start up programmable CPU core 101. Memory 103 (e.g., an SRAM memory) stores authorized firmware, which may be downloaded via a port (not shown) of device 100. In addition to the firmware in SRAM 103, programmable CPU core 101 may be programmed via scan chains accessible through debug access point (DAP) 104 and debugging bus 114.

A one-time programmable life-cycle fuse module 105 controls the advance of integrated circuit device 100 through the various life-cycle steps. An example 200 of the life-cycle steps, described above, is shown in FIG. 2. The device begins, at the time of manufacture, in CM state 201. At this stage, no one-time programmable keys are set and JTAG access is unlocked; the device is ready for initial configuration. The unique device ID (UUID) referred to above, if used, may be recorded at this point into unalterable memory (e.g., OTP fuse memory) of device 100. Device 100 is ready at this point to be advanced, at 211, by the burning of a fuse in module 105, to the DM state 202, during which an original equipment manufacturer prepares device 100 for provision to an end user.

Figure 2:
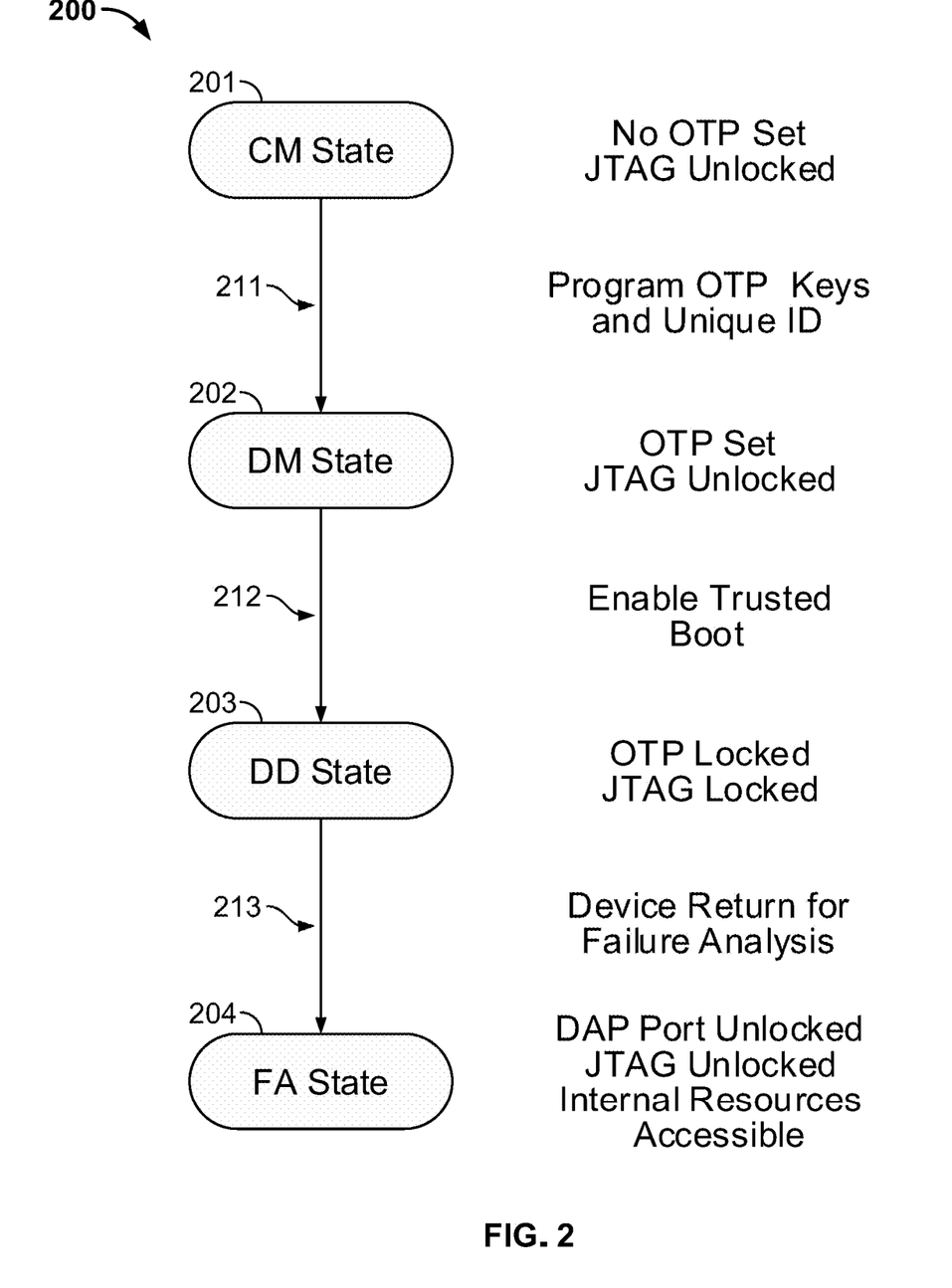
FIG. 2 is a diagram showing the lock states of a device such as that of FIG. 1.

As noted above, in DM state 202, OTP keys are burned in and locked, but JTAG remains open for programming. As part of this stage, any trusted (e.g., PKI-based) boot routine is enabled. Device 100 is provided to the end user, who may add programming (e.g., via JTAG), and then at 212, by the burning of another fuse in module 105, device 100 is advanced to DD state 203 for deployment in the field. At this point, all programming is locked down and JTAG access is closed.

If device 100 fails in the field and must be returned, it is desirable to be able to enter FA state 204. Therefore, although device 100 is locked down in DD state 203, device 100 remains open to the unlocking authorization process. Thus, if device 100 is returned for failure analysis, then at 213 the unlocking authorization process is carried out, and the final life-cycle fuse in module 105 is burned to enter FA state 204, in which programming access is unlocked so that the device scan chains can be probed.

Figure 3:
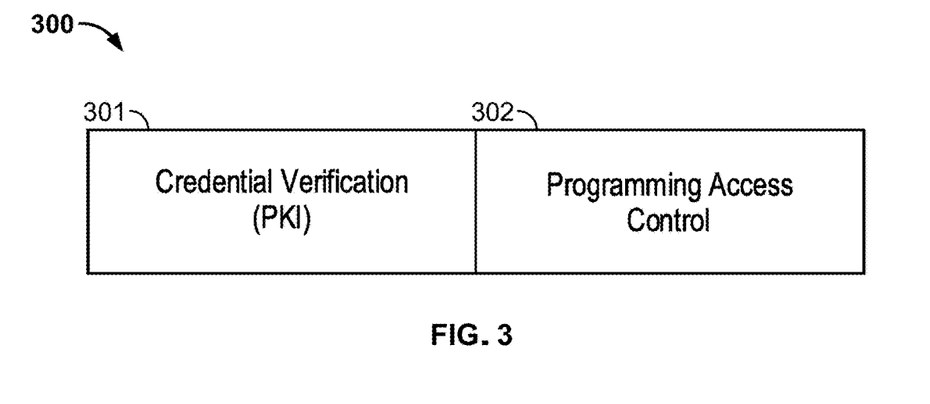
FIG. 3 is a representation of a programming message.
Figure 4:
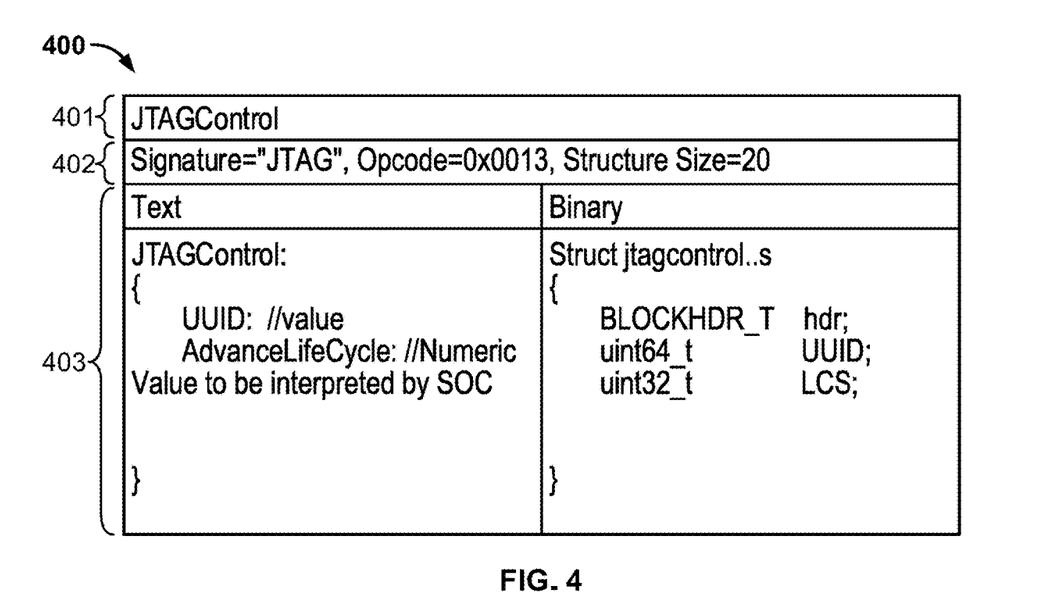
FIG. 4 is a representation of one block within the message of FIG. 3.

As noted above, at the beginning of the boot process, or shortly thereafter, following verification of credentials (e.g., PKI key and/or password) the time-based register lock bit 112 is changed to a state in which requests are accepted to authorize re-enabling the programming access. As part of the authorization process, a boot message or header 300 (FIG. 3) is sent to the boot device 102 while device 100 is being booted up. Message 300 contains at least a block 301, including the credentials for verification, and a programming access control block 302. Programming access control block 302 may include, as in the example block 400 of FIG. 4, a name field 401 and corresponding signature field 402, identifying block 400 as a programming access control block (in this case, a JTAG control block), followed by a field 403 including the unique identification (UUID) referred to above, and an indication of the life cycle state (LCS) to which the device should be advanced. For example, if there are four states as described above, the states could respectively be numbered 0, 1, 2, 3, and the FA state would be indicated by a '3' (or '11' in binary).

Message 300 is processed by boot device 102, which outputs time-based register lock bit 112 following the predetermined interval (which may be of zero duration) after the boot process begins. Returning again to FIG. 1, time-based register lock bit 112 is input to lock control circuit 115 of one-time programmable life-cycle fuse module 105 to unlock module 105 for processing of requested life-cycle changes. Lock control circuit 115 remains in the unlocked state either for all of the boot cycle or a predetermined portion of the boot cycle. If boot device 102 outputs programming bypass disable bit 122 based on the arrival of message 300 within that unlocked time window, programming bypass disable bit 122 is input into lock control circuit 115 to unlock the transition 125 from the DD state to the FA state. If the state of register lock bit 112 has returned to its locked state before programming bypass disable bit 122 has been changed, then programming bypass disable bit 122 will not have any effect on the device state.

Time-based register lock bit 112 and programming bypass disable bit 122 may be communicated to lock control circuit 115 on system bus 106—which may, e.g., be an Advanced eXtensible Interface (AXI) bus—which normally is used for system trace data.

Following the setting of programming bypass disable bit 122, the transition 125 from the DD state to the FA state may be initiated by a separate LCS transition signal 125 from boot device 102. Alternatively, once boot device 102 has authorized the programming access, the separate LCS transition signal 125 to initiate transition 213 from the DD state to the FA state can be issued by another component of device 100, such as programmable CPU core 101, or by firmware loaded by boot device 102—e.g., via bus 106. However, by no later than the end of the boot cycle, boot device 102 resets time-based register lock bit 112 to the locked state so that, assuming that the LCS state was not advanced to the FA state during the boot cycle, no other commands (e.g., issued by a malicious user) to enter the FA state can be entered, at least until the next boot cycle.

As a further security measure, debug access point 104 is bypassed in the DD state. Therefore, any attempted JTAG access when integrated circuit device 100 is in the DD state, based on trace data input 117 to JTAG test access port (TAP) controller 107 may be routed through bypass logic 108 to trace data output 127, without reaching debug access point 104. Only when programming bypass disable bit 122_ is set (meaning that bypass logic 108 should be disabled), or device 100 is in the FA state, or both, does the output of OR-gate 109 controls multiplexers 119 to route the JTAG commands to debug access point 104. Otherwise, if programming bypass disable bit 122 is not set, and device 100 is not in the FA state, the output of OR-gate 109 controls multiplexers 119 to route the JTAG commands to bypass logic 108 rather than to debug access point 104.

Device 100 may operate in many different environments. Therefore, boot device 102 can accept message 300 from any available interface. For example, device 100 may have an Ethernet connection or a simple asynchronous port such as a Universal Asynchronous Receiver/Transmitter (UART).

Figure 5:
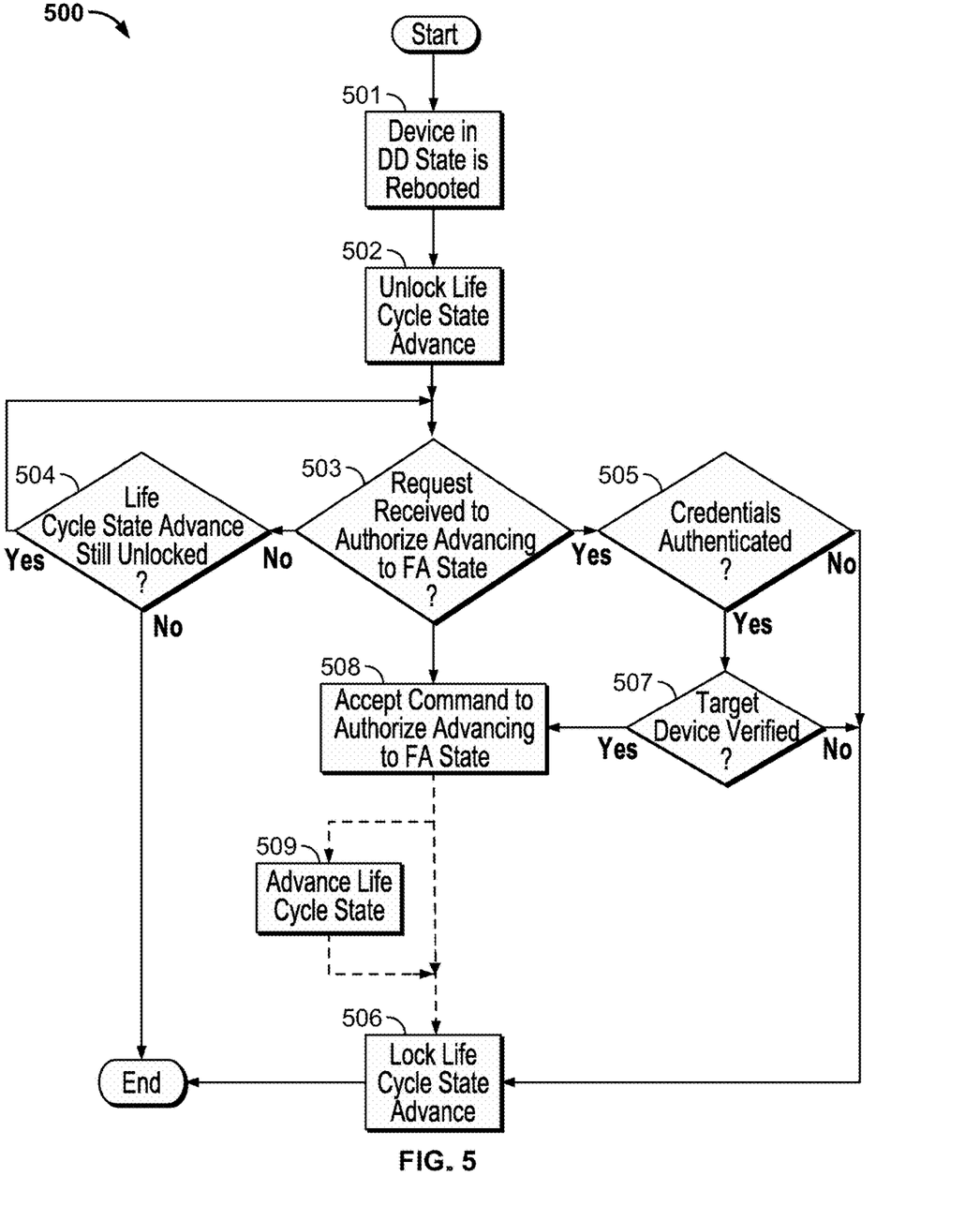
FIG. 5 is a flow diagram of a method according to the subject matter of this disclosure.
Figure 6:
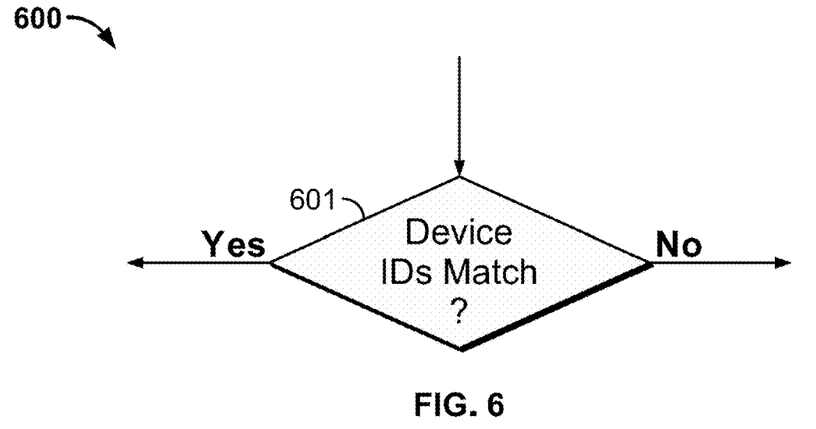
FIG. 6 is a flow diagram showing a first implementation of a portion of the diagram of FIG. 5.
Figure 7:
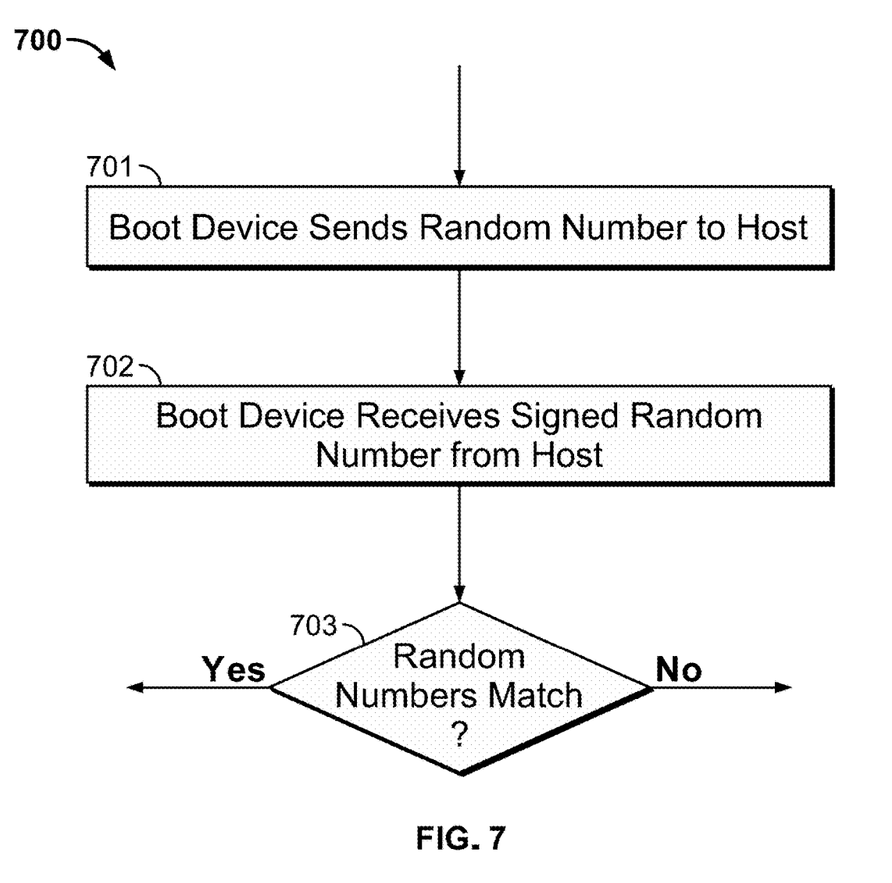
FIG. 7 is a flow diagram showing a second implementation of a portion of the diagram of FIG. 5.

Operation of implementations of the subject matter of this disclosure may be understood by reference to the flow diagrams of FIGS. 5-7.

In implementation 500 of FIG. 5, a device 100 in the DD state is rebooted at 501. At 502, immediately upon rebooting or after a predetermined interval following rebooting, the ability to authorize the Life Cycle State to be advanced is unlocked (e.g., by changing the state of register lock bit 112). Next, at 503, it is determined whether a request to authorize advancing of the Life Cycle State has been received. If not, then it is determined at 504 whether the ability to authorize the Life Cycle State to be advanced is still unlocked. If not, then implementation 500 ends. If at 504 it is determined that the ability to authorize the Life Cycle State to be advanced is still unlocked, then flow returns to 503 to await a request to authorize advancing of the Life Cycle State.

When, at 503, a request to authorize advancing of the Life Cycle State has been received, it is determined at 505 whether the credentials (e.g., PKI key and/or password) in the request can be authenticated. If not, then at 506 the ability to advance the Life Cycle State is locked until the next reboot, and implementation 500 ends. If at 505 the credentials can be authenticated, then at 507 it is determined whether the target device can be verified—i.e., as discussed above, whether it can be proven that the authorization was targeted to the current device (see FIGS. 6 and 7). If not, then at 506 the ability to advance the Life Cycle State is locked until the next reboot, and implementation 500 ends. If at 507, the target device can be verified, then at 508 the request to authorize advancing the Life Cycle State is accepted (authorization is granted by setting programming bypass disable bit 122). Next, at 509, the Life Cycle State may actually advance from the DD state to the FA state based on a separate command from boot device 102 or elsewhere as discussed above (technically, this separate from authorization process 500), after which, or if the Life Cycle State is not advanced notwithstanding the authorization at 508 (because no command to do so is received), at 506 the ability to advance the Life Cycle State is locked until the next reboot, and implementation 500 ends.

FIGS. 6 and 7 show two different possible implementations (though still others may be possible) of target device verification 507. In implementation 600 of FIG. 6, at 601, it is determined whether the device ID in the request matches the device ID stored in the device, as discussed above. Alternative implementation 700 of FIG. 7 begins at 701, where boot device 102 sends a random number to the host device (the device that requested the authorization to advance the Life Cycle State). The host digitally signs and returns the random number (not shown). At 702, boot device 102 receives the returned signed random number, and at 703 it is determined whether the returned signed random number is consistent with the random number originally sent at 701.

Thus it is seen that a programmable integrated circuit device in which life cycle states are implemented, and in which authorization is required to change the life cycle state from a programmed operational state in which access to programming resources is not available, to an analysis or inspection state in which access to programming resources is permitted, as well as a method for obtaining such authorization, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of diagnosing a programmable integrated circuit device having (i) a state during which user functions of the programmable integrated circuit device are operational and programming resources of the programmable integrated circuit device are locked, and (ii) an inspection state during which the programming resources of the programmable integrated device are accessible and user functions of the programmable integrated circuit device are inaccessible; the method comprising:
   rebooting the programmable integrated circuit device;
   receiving, during the rebooting, a request from a requester to the programmable integrated circuit device to authorize an advance from the operational state to the inspection state; and
   verifying the request and authorizing a unidirectional advance from the operational state to the inspection state when the request is verified, the unidirectional advance preventing return of the programmable integrated circuit device from the inspection state to the state during which user functions of the programmable integrated circuit device are operational.

2. The method of claim 1, wherein the verifying comprises authenticating credentials included in the request.

3. The method of claim 1, wherein:
   the verifying comprises determining that the request is received during a predetermined time interval during a boot cycle of the programmable integrated circuit device; the method further comprising:
   limiting, to the predetermined time interval during the boot cycle of the programmable integrated circuit device, the authorization of the unidirectional advance from the operational state to the inspection state.

4. The method of claim 3, wherein the time interval is coterminous with the boot cycle.

5. The method of claim 3, wherein the time interval begins at a predetermined time after the boot cycle begins.

6. The method of claim 3, wherein the time interval ends at a predetermined time before the boot cycle ends.

7. The method of claim 1, wherein the verifying comprises verifying that the request is targeted at the programmable integrated circuit device.

8. The method of claim 7, wherein the verifying comprises comparing an identifier in the request to a unique identifier stored in an unalterable memory of the programmable integrated circuit device.

9. The method of claim 7, wherein the verifying comprises:
   generating a random number;
   sending the generated random number to the requester;
   receiving a digitally signed random number from the requester; and
   comparing the digitally signed random number to the generated random number.

* * * * *